(12) United States Patent  (10) Patent No.: US 6,690,864 B1
Dee et al.  (45) Date of Patent: Feb. 10, 2004

(54) SYSTEM AND METHOD FOR INSTALLATION AND ALIGNMENT OF OPTICAL FIBER

(75) Inventors: Richard Dee, Acton, MA (US); Thomas D. Williams, Waltham, MA (US); Dale C. Flanders, Lexington, MA (US)

(73) Assignee: Axsun Technologies, Inc., Billerica, MA (US)

( * ) Notice: Subject to any disclaimer, the term of this patent is extended or adjusted under 35 U.S.C. 154(b) by 254 days.

(21) Appl. No.: 09/754,715

(22) Filed: Jan. 4, 2001

(51) Int. Cl.$^7$ ................................................. G02B 6/26
(52) U.S. Cl. ......................................... 385/52; 385/147
(58) Field of Search ............................. 385/52, 88, 90, 385/91, 147

(56) References Cited

U.S. PATENT DOCUMENTS 6,325,551 B1 * 12/2001 Williamson, III et al. .... 385/88

OTHER PUBLICATIONS

Henein, S., Aymon, C., Bottinelli, S., & Clavel, R., "Articulated Structures With Flexible Joints Dedicated to High Precision Robotics"; Institut de Systemes Robotoques (DMT–ISR), Swiss Federal Institute of Technology Lausanne (EPFL), EPFL CH–1015 Lausanne, Switzerland. Conference: Moscow, Russia, Nov. 24–25, 1999.

\* cited by examiner

*Primary Examiner*—Khiem Nguyen
(74) *Attorney, Agent, or Firm*—J. Grant Houston

(57) ABSTRACT

An automated system and method for location and insertion of a fiber optic end in the ferrule of a hybrid package provides for efficient and accurate alignment. In one embodiment, the fiber is mounted on a fiber chuck that is presented to the package by a micropositioner having four degrees of freedom. These include the three orthogonal cardinal axes (x, y, and z-axes), and a fourth degree of freedom comprising angular rotation θ about the z-axis. Feedback mechanisms may be provided regarding orthogonal and angular positioning in order to optimize coupling efficiency between the fiber optic and the electronic circuit contained in the package. In another embodiment, the fiber chuck includes a longitudinal groove for seating the fiber optic during an alignment procedure. The groove interfaces with a vacuum manifold that serves to secure the optical fiber to the chuck during alignment.

22 Claims, 5 Drawing Sheets

SYSTEM AND METHOD FOR INSTALLATION AND ALIGNMENT OF OPTICAL FIBER

BACKGROUND OF THE INVENTION

In contemporary optical-electronic hybrid systems, an optical fiber typically interfaces with an opto-electronic device. The opto-electronic device usually includes a hermetic package, having conductive leads for electronic communication with devices external to the package.

During manufacture, single or multiple fiber optic pigtails are inserted through ferrules provided in sidewalls of the package. Typically, pigtail-level assembly is usually performed manually by assembly personnel who visually align, and then insert, each fiber into its ferrule. The endface of each pigtail is typically positioned and secured to a bench or submount, which is installed within the package. The pigtail is also bonded to its corresponding ferrule to enable hermetic sealing of the package.

Additionally, it is also sometimes important to optimize the angular orientation of the fiber endface relative to the optical circuit in order to increase coupling efficiency and/or polarization extinction. Conventionally, angular control is achieved via manual rotation of the fiber prior to bonding by assembly personnel.

SUMMARY OF THE INVENTION

The present invention is directed to a system and method for automated fiber insertion into an opto-electronic hybrid package that overcome the limitations of conventional insertion techniques. In particular, the present invention provides for automated location and insertion of a pigtail into the ferrule, a possibly active or passive alignment to opto-electronic components within the package.

In general, according to one aspect, the invention provides for the mounting of a fiber on a fiber chuck, after which it is presented to the package by a system providing for four degrees of freedom. The degrees of freedom include the three orthogonal cardinal axes (x, y, and z-axes), and a fourth degree of freedom corresponding to angular rotation θ about the z-axis. In this manner, the fiber is positioned in the ferrule of the package.

In some embodiments, feedback mechanisms are provided for the orthogonal (x, y, and z-axis) and angular positioning in order to optimize coupling efficiency and/or polarization extinction, for example, between the fiber and the electronic circuit mounted in the package.

In one implementation, the fiber chuck includes a longitudinal groove for seating the fiber during an alignment procedure. The groove interfaces preferably with a vacuum manifold that serves to seat the fiber in the chuck during alignment.

In the present implementation, the system includes a package mount for securing a package having an optical alignment feature.

The positioner may receive position data related to the position of the optical alignment feature, and may further utilize the position data during an alignment procedure.

In one embodiment, the positioner comprise a longitudinal bench, a lateral bench and a vertical bench, each bench being independently positionable along the directions of the respective longitudinal, lateral, and vertical axes. Position encoders are included for providing position data of the respective benches along the respective axes.

A fiber rotation drive is included for rotationally orienting the fiber about the longitudinal axis. In this case, an angular encoder provide angular data of the fiber about the longitudinal axis. A sensor may also be included in the package mount for receiving optical signals transmitted along the fiber optic during an alignment operation, and for providing intensity data to the positioner.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
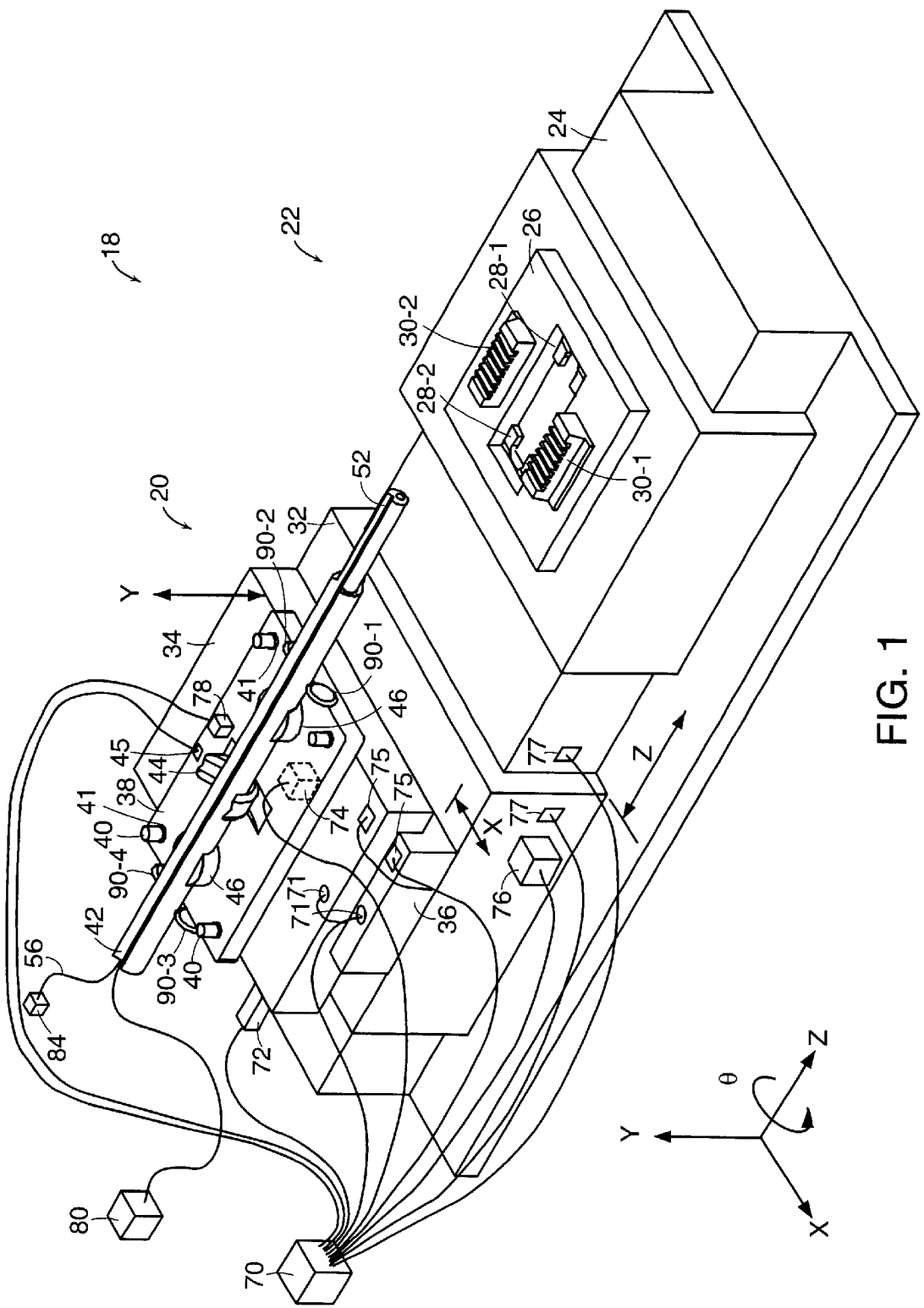
FIG. 1 is a perspective view of a fiber optic insertion and alignment apparatus, in accordance with the present invention.

With reference to FIG. 1 the fiber alignment and insertion apparatus 18 of a first embodiment of the present invention includes a first carriage 20 and a second carriage 22, one, or both, being mounted to slide on rail 24 in a direction along a z-axis.

The first carriage 20 includes a z-axis platform 32, a y-axis platform 38, an x-axis platform 34, and a fiber chuck 42. Each platform translates along the z-axis (longitudinal), y-axis (vertical) and x-axis (lateral) respectively so as to allow for three orthogonal degrees of freedom for positioning the fiber chuck 42 relative to a package mounted to the second carriage 22. A fourth degree of freedom controlled by a chuck rotation drive 44 provides for angular rotation θ of the chuck 42 about the z-axis. Control over the degrees of freedom is preferably provided in a closed-loop feedback system managed by a controller 70.

The second carriage 22 includes a package chuck or pallet 26, including a package clamp 28 and an electrical lead clamp 30. The package clamps 28-1, 28-2 secure a package in position during an alignment operation. Lead clamps 30-1, 30-2 make electrical contact to the package electrical leads or pins. In one embodiment, the second carriage 22 is fixed to the rail 24. In another embodiment, the second carriage 22 slides on the rail under control of the controller 70, in order to allow for translation along the z-axis.

Figure 2:
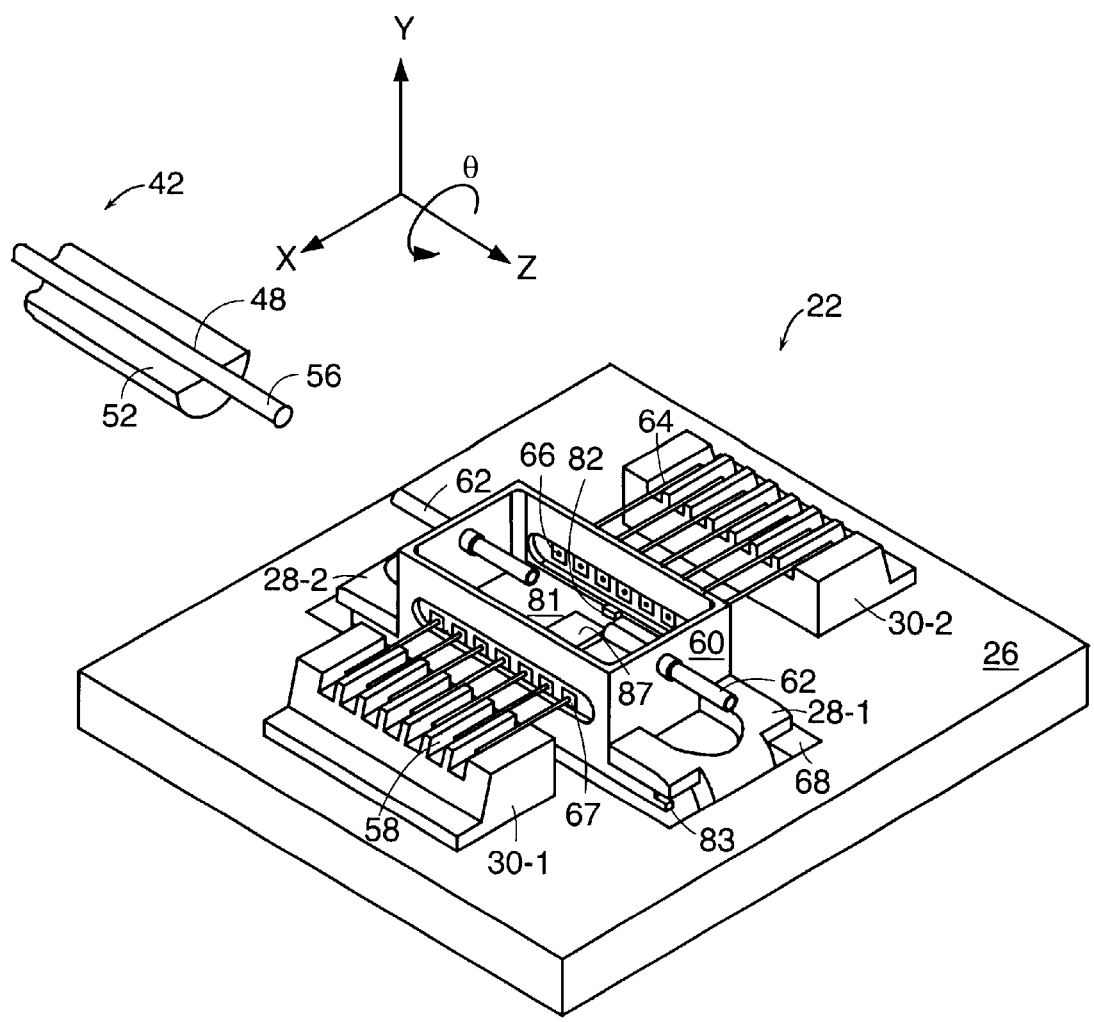
FIG. 2 is a close-up perspective view of a package mount, illustrating alignment of a fiber optic with a ferrule in a package, in accordance with the present invention.

The close-up perspective view of FIG. 2 illustrates alignment of the fiber optic pigtail 56 with the package 60. A fiber chuck 42 includes a longitudinal groove (illustrated and described in detail below in conjunction with FIGS. 3A and 3B), in which the pigtail 56 is mounted. The end of the pigtail 56 projects toward the ferrule from the chuck 42. The chuck 42 is positioned along the x, y and z-axes, and angularly rotatable θ about the z-axis, with respect to the package 60, under control of the controller 70.

The package 60 includes single, or multiple, ferrules 62, through each of which an end of the fiber optic 56 is inserted during an installation/alignment operation. A plurality of wire bonding pads 66 are provided within the package for bonding between an opto-electronic component and the package leads or pins 64. External lead pads 67 are provided as a bonding surface for the external package leads 64.

In one embodiment, an optical bench or submount 81 is installed within the package 60, typically on a thermoelectric cooler that provides for temperature control within the package 60. An opto-electronic component 87 is installed on this bench 81. In one implementation, this opto-electronic component 87 is an opto-electronic detector, possibly with a tunable Fabry-Perot filter. In another embodiment, it is an opto-electronic signal generator, such as a semiconductor laser or laser system. A wire bond is provided between the opto-electronic component 87 and the bond pads 66.

During fabrication of the package, or upon receipt of the package from a vendor, data related to the positioning of the ferrules 62 with respect to the package body, as well as the length of the ferrules, are recorded. When a package is mounted on the alignment system of the present invention, these data are made available to the controller 70 (see FIG. 1), in order to provide detailed information related to the specific physical geometry of the individual package.

A package body 60 is mounted to the chuck 26 as shown. An aperture 68 in the chuck 26 houses first and second package clamps 28-1, 28-2, which physically secure the package in position on the chuck 26. An optional reference pin or feature 83 serves as a positional reference for the package when mounted to the chuck. The package leads 64 are likewise secured by the lead clamps 30, including pivoting paddles 58, preferably imparting null insertion force on the leads, for establishing electrical continuity.

Following registration and clamping of a package 60 on the chuck, the optical fiber 56 is inserted into the axial bore of the ferrule 62 by the micropositioner. In one embodiment, an optical signal is injected into a distal end of the fiber pigtail 56 (see FIG. 1) by signal source 84 during an alignment sequence, during which sensors 82 detect light emitted from the end face of the fiber to determine optimal orthogonal and rotational alignment. Alternatively, the opto-electronic component 87 is a laser, which is energized via the leads 64. Component 80 functions as a detector to determine the coupling efficiency of light from the laser into the fiber via the endface. As an example, optimal alignment is determined as a function of signal coupling efficiency between the endface of the pigtail and the opto-electronic component in the package. Sensor feedback is provided to the controller 70 (see FIG. 1) to provide a closed-loop positioning system.

Following insertion and alignment, the fiber is soldered or otherwise bonded to the bench in the package 60.

Returning to FIG. 1, the first carriage 20 includes an z-axis platform 32 that slides on the rail 24. The interface between the z-axis platform 32 and rail 24 preferably comprises an air bearing that permits nearly frictionless motion of the platform 32 relative to the rail 24. A z-translation motor 76, for example a voice-coil, translates the z-axis platform 32 along the z-axis. Positional encoders 77 provide feedback to the z-translation motor 76, and the controller 70, to provide for a closed-loop system.

Preferably, the position encoder is an optical encoder, such as a traditional chrome-on-glass encoder or preferably an optical encoder including a diffractive phase grating, a laser diode, and a detector array. In one embodiment, the laser detector combination is secured to the z-axis platform 32 and the grating is secured to the slide 24.

An x-axis rail 36 is mounted on the z-axis platform such that the longitudinal axis of the x-axis rail 36 is orthogonal to the z-axis. An x-axis platform 34 slides on the x-axis rail 36, for example interfacing via a roller bearing or air bearing. An x-translation motor 72, for example a voice-coil, provides for translation of the x-axis platform 34 along the x-axis. Positional encoders 75 such as optical encoders, provide feedback to the x-translation motor 72, and the controller 70, to provide for a closed-loop system.

A plurality of y-axis precision dowel pins 40 extend vertically from the x-axis platform 34, and are oriented orthogonally with respect to the x-axis and z-axis. A y-axis platform 38 includes corresponding TEFLON® fluoropolymer bearings 41 to provide for a low friction interface between the y-axis platform 38 and the dowel pins 40 along the y-axis. A y-translation motor 74, for example a voice-coil, provides for translation of the y-axis platform 38 along the y-axis. Positional encoders 71 provide feedback to the y-translation motor 74, and the controller 70, to provide for a closed-loop system.

The chuck 42 is positioned on the y-axis platform 38 as shown, oriented such that its longitudinal axis is directed along the z-axis. Specifically, the fiber chuck 42 is supported on four cylindrical rollers 90-1, 90-2, 90-3, 90-4, which are journaled to the y-axis platform 38. Optional rare earth magnets 46 having an inner circular contour closely matching an outer circular. contour of the chuck 42. They are used to flatten the fiber, held in the chuck, into the chuck's channel.

A chuck rotation drive 44 is fixed to the outer surface of the chuck 42 to provide for rotational motion of the chuck 42 about the z-axis on front and back rollers 90. The drive comprises, for example, a plastic worm gear driven by a screw, in turn driven by chuck rotation motor 78. In the current embodiment, optional angular encoders 45 provide feedback to the chuck rotation motor 78, which, in conjunction with optical feedback provided by sensors 82 (see FIG. 2), provide for a closed-loop system. At least 260 degrees of chuck rotation is preferably provided in order to fully inspect and evaluate the fiber endface's far or near field emission pattern in the package, to enable optimization of the coupling efficiency between the endface 56 and component 87.

Figure 3A:
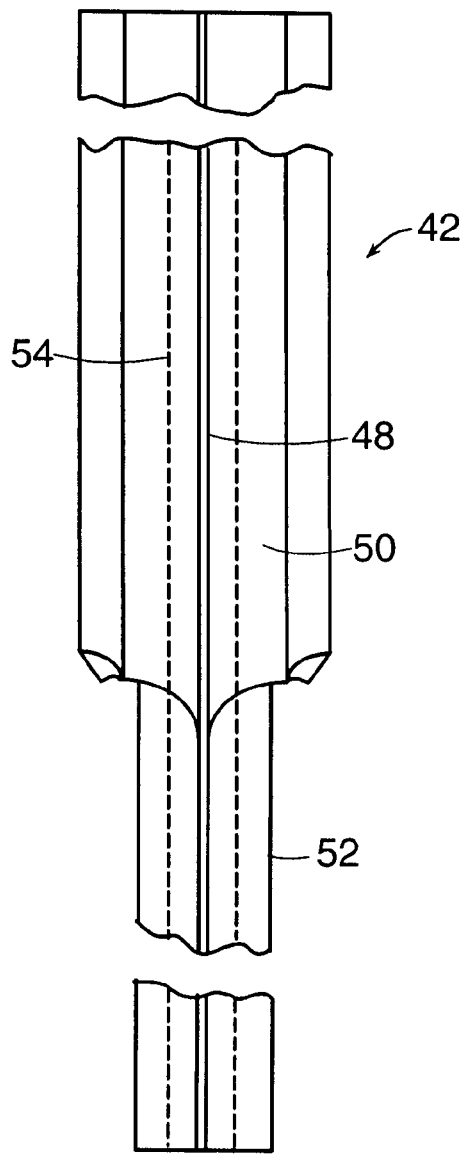
FIGS. 3A and 3B are close-up top and end views respectively of a fiber chuck in accordance with the present invention.
Figure 3B:
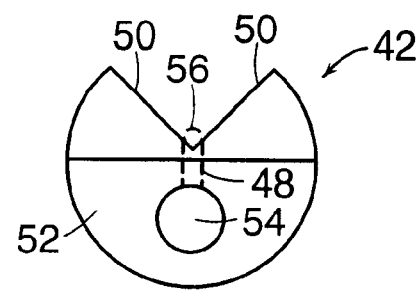

FIGS. 3A and 3B are close-up top and end views respectively of the fiber chuck 42. The body of the fiber chuck 42 is circular in cross-section and includes a V-shaped groove 50. A slit 48 is provided at the base of the V-groove. The slit 48 extends into a longitudinal vacuum manifold 54. The slit is preferably of a width less than the diameter of the fiber optic for which the chuck is designed for use such that the fiber 56 rests tangentially in the groove 50, as shown in FIG. 3B.

A vacuum is drawn in the vacuum manifold 54 by vacuum unit 80 (see FIG. 1). The vacuum draws air from the slit 48, thereby sealing and securing the inserted fiber optic 56 against the walls of the V-groove 50 in cooperation with magnets 46. By virtue of the inwardly directed force imparted by the vacuum, the fiber optic is longitudinally and rotationally secured in the chuck 42 during an alignment procedure. A distal end 52 of the chuck 42 is provided with a flat profile, so as to allow for improved dexterity in aligning the fiber optic with the package ferrule.

Figure 4A:
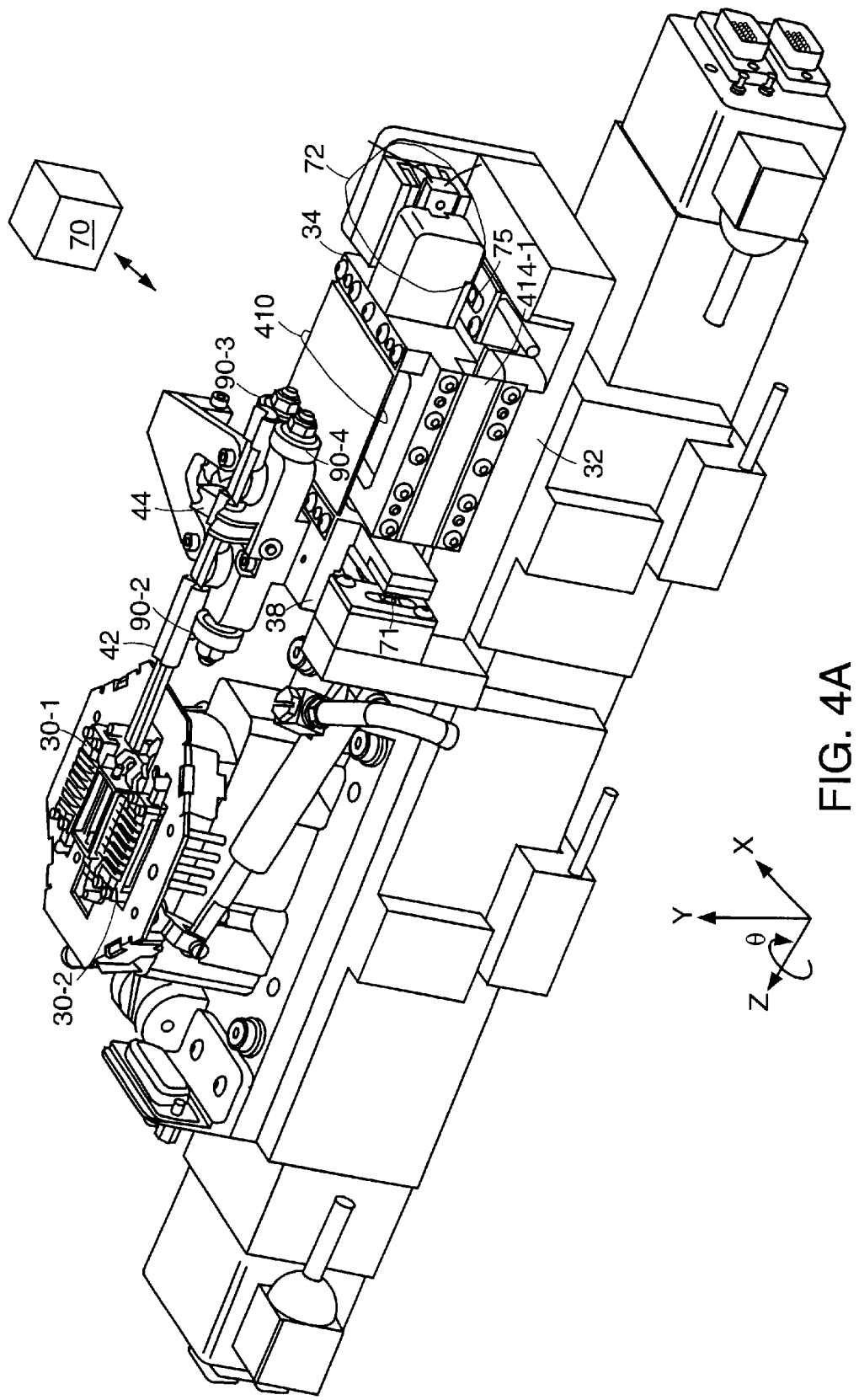
FIGS. 4A and 4B are perspective views of a second embodiment of the fiber pigtail insertion and alignment system, according to the present invention.
Figure 4B:
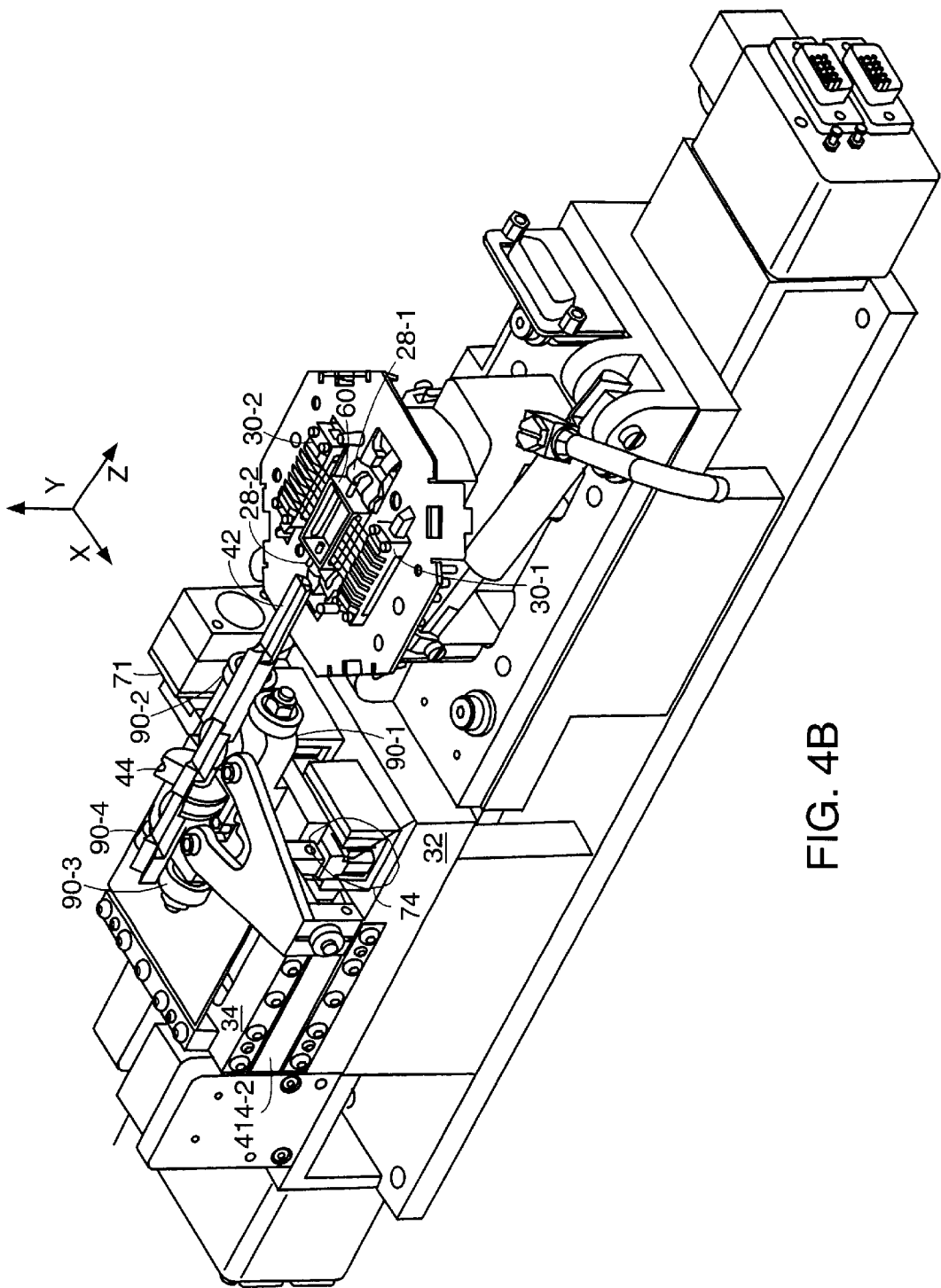

FIGS. 4A and 4B illustrates a second embodiment of the fiber alignment and insertion apparatus. The second embodiment is generally similar to the first embodiment, having similar reference numerals to indicate similar features.

The second embodiment, however, differs insofar as it uses a flexure-based positioning system. Specifically, Y-axis platform 38 is connected to x-axis platform 34 via a flexure 410. A Y-axis optical encoder system 71 detects the Y-axis height of the Y-axis platform 38. A Y-axis voice coil and stator system (y-axis translation motor) 74 operate as the Y-axis actuation system. The X-axis platform 34 is connected to the Z-axis platform 32 via two X-axis flexures 414-1, 414-2. X-axis voice coil or translation motor 72 functions as the X-axis actuation system to pivot the X-axis platform 34 on the flexures 414-1, 414-2 relative to the Z-axis platform 32. An X-axis position detector 75 detects the X-axis position of the X-axis platform 34 relative to the Z-axis platform 32. Again, this position detection system is preferably an optical encoder having a grating and detector pair.

In this manner, the present invention provides an apparatus and method by which a fiber optic is automatically aligned with a ferrule in an optical-electrical hybrid package in manner that provides for improved precision and reduced assembly costs.

While this invention has been particularly shown and described with references to preferred embodiments thereof, it will be understood by those skilled in the art that various changes in form and details may be made herein without departing from the spirit and scope of the invention as defined by the appended claims.

What is claimed is:

1. A system for automated alignment of a optical fiber with a package comprising:
   a package mount for securing a package having an optical alignment feature; and
   a positioner for aligning the optical fiber with the optical alignment feature, the optical fiber having a longitudinal axis, the positioner providing for alignment of the optical fiber along the longitudinal axis and along orthogonal lateral and vertical axes, and providing for rotational orientation of the optical fiber about the longitudinal axis.

2. The system of claim 1 wherein the optical alignment feature comprises a ferrule.

3. The system of claim 1 wherein the positioner further comprises a fiber chuck.

4. The system of claim 3 wherein the fiber chuck is elongated along the longitudinal axis and rotates about the longitudinal axis.

5. The system of claim 3 wherein the fiber chuck further comprises an elongated groove for seating the optical fiber during alignment.

6. The system of claim 5 wherein the fiber chuck further comprises a vacuum manifold in communication with the elongated groove.

7. The system of claim 6 further comprising a vacuum unit for evacuating the vacuum manifold to urge the fiber optic in position in the groove.

8. The system of claim 5 further comprising an elongated slit between the vacuum manifold and the elongated groove.

9. The system of claim 3 wherein the fiber chuck interfaces with the positioner at rotational bearings.

10. The system of claim 9 wherein the rotational bearings comprise magnetic material.

11. The system of claim 1 wherein the positioner receives position data related to the position of the optical alignment feature, and utilizes said position data during an alignment procedure.

12. The system of claim 1 wherein the positioner comprises a longitudinal bench, a lateral bench and a vertical bench, each bench being independently positionable along the directions of the respective longitudinal, lateral, and vertical axes.

13. The system of claim 12 further comprising axial position encoders for providing axial position data of the respective benches along the respective axes.

14. The system of claim 1 wherein the positioner comprises a fiber rotation drive for rotationally orienting the fiber about the longitudinal axis.

15. The system of claim 14 further comprising an angular encoder for providing angular data of the optical fiber about the longitudinal axis.

16. A system for automated alignment of a optical fiber with a package comprising:
   a package mount for securing a package having an optical alignment feature; and
   a positioner for aligning the optical fiber with the optical alignment feature, the optical fiber having a longitudinal axis, the positioner providing for alignment of the optical fiber along the longitudinal axis and along orthogonal lateral and vertical axes, and providing for rotational orientation of the optical fiber about the longitudinal axis;
   wherein the positioner comprises a fiber rotation drive for rotationally orienting the optical fiber about the longitudinal axis;
   wherein the package mount further comprises a sensor for receiving optical signals transmitted along the optical fiber during an alignment operation, and for providing intensity data to the positioner.

17. A system for automated alignment of a fiber optic with a package comprising:
   a package mount for securing a package having an optical alignment feature;
   a positioner for aligning a fiber optic with the optical alignment feature, the fiber optic having a longitudinal axis, the positioner providing for alignment of the fiber optic along the longitudinal axis and along orthogonal lateral and vertical axes, and providing for rotational orientation of the fiber optic about the longitudinal axis;
   a signal source for injecting an optic signal into the fiber optic; and
   a sensor positioned proximal to the package mount for detecting the optic signal at the end face of the fiber optic and for generating a sensor signal used by the positioner to determine optimal orthogonal and rotational positioning of the fiber optic.

18. The system of claim 17 wherein the optimal orthogonal and rotational positioning is based on coupling efficiency at an end face of the fiber optic.

19. A system for automated alignment of a fiber optic with a package comprising:
   a package mount for securing a package having an optical alignment feature; and
   a positioner for aligning a fiber optic with the optical alignment feature, the fiber optic having a longitudinal axis, the positioner providing for alignment of the fiber optic along the longitudinal axis and along orthogonal lateral and vertical axes, and providing for rotational orientation of the fiber optic about the longitudinal axis, wherein the positioner includes a longitudinal bench, a lateral bench and a vertical bench, each bench being independently positionable along the directions of the respective longitudinal, lateral, and vertical axes, the respective benches being coupled to each other by first and second flexures allowing for freedom of movement along the lateral and vertical axes respectively.

20. The system of claim 19 wherein the first flexure is coupled between the longitudinal bench and the lateral bench and wherein the first flexure permits movement of the lateral bench along the lateral axis.

21. The system of claim 20 wherein the second flexure is coupled between the lateral bench and the vertical bench and wherein the second flexure permits movement of the vertical bench along the vertical axis.

22. The system of claim 1 wherein the positioner further comprises carriage and a fiber chuck extending horizontally from the carriage to insert the optical fiber horizontally through a fiber feedthrough, of the package, into the package.

* * * * *